US010106063B2

(12) United States Patent
Kim et al.

(10) Patent No.: US 10,106,063 B2
(45) Date of Patent: Oct. 23, 2018

(54) COLD/WARM HEADREST FOR VEHICLE AND METHOD OF CONTROLLING OPERATION THEREOF

(71) Applicant: Hyundai Motor Company, Seoul (KR)

(72) Inventors: Jae Woong Kim, Hwaseong-si (KR); So La Chung, Seoul (KR); Jae Woo Park, Ansan-si (KR); Ji Hyun Jang, Seoul (KR); Man Ju Oh, Yongin-si (KR); Sang Shin Lee, Suwon-si (KR); So Yoon Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 43 days.

(21) Appl. No.: 15/350,317

(22) Filed: Nov. 14, 2016

(65) Prior Publication Data

US 2018/0009349 A1    Jan. 11, 2018

(30) Foreign Application Priority Data

Jul. 8, 2016    (KR) .................. 10-2016-0086680

(51) Int. Cl.
| | |
|---|---|
| *A47C 7/72* | (2006.01) |
| *A47C 31/00* | (2006.01) |
| *B60N 2/56* | (2006.01) |
| *B60N 2/879* | (2018.01) |

(52) U.S. Cl.
CPC ......... *B60N 2/5657* (2013.01); *B60N 2/5678* (2013.01); *B60N 2/879* (2018.02)

(58) Field of Classification Search
CPC ...... B60N 2/5657; B60N 2/80; B60N 2/5678; B60N 2/56; B60N 2/5607; B60N 2/5621; B60N 2/5664; B60N 2/5671; B60N 2/5628; B60N 2/5635; B60N 2/5685
USPC .............. 297/180.14, 180.1, 180.11, 180.12, 297/180.13
See application file for complete search history.

(56) References Cited

U.S. PATENT DOCUMENTS

| | | | | |
|---|---|---|---|---|
| 2005/0040682 A1* | 2/2005 | Ulbrich | ................ | B60N 2/5678 297/180.12 |
| 2013/0193893 A1* | 8/2013 | Brown | ................... | G05B 11/16 318/473 |
| 2016/0009206 A1* | 1/2016 | Perraut | ................ | B60N 2/5635 297/180.12 |
| 2016/0052362 A1* | 2/2016 | Thomas | ............. | B60H 1/00478 62/3.3 |
| 2016/0250956 A1* | 9/2016 | Seiting | ................ | B60N 2/5671 297/180.14 |
| 2017/0354190 A1* | 12/2017 | Cauchy | ................ | A41D 13/005 |

FOREIGN PATENT DOCUMENTS

| | | |
|---|---|---|
| JP | 2006-334056 A | 12/2006 |
| JP | 2014-24541 A | 2/2014 |
| KR | 2001-0105745 A | 11/2001 |
| KR | 1020040088273 A | 10/2004 |

(Continued)

*Primary Examiner* — Mark R Wendell
(74) *Attorney, Agent, or Firm* — Morgan, Lewis & Bockius LLP

(57) ABSTRACT

Disclosed herein are a cold/warm headrest for a vehicle and a method of controlling operation thereof. It is possible to provide cold air to an occipital region, a head, and a face of a seated occupant, and to provide warmth to a neck and shoulders of the occupant, in which the trapezius muscles are located along with peripheral nerves.

16 Claims, 10 Drawing Sheets

(56) References Cited

FOREIGN PATENT DOCUMENTS

| KR | 10-2010-0025389 A | 3/2010 |
|----|-------------------|--------|
| KR | 10-2011-0061736 A | 6/2011 |
| KR | 1020150059677 A   | 6/2015 |
| KR | 1020160022272 A   | 2/2016 |

* cited by examiner

COLD/WARM HEADREST FOR VEHICLE AND METHOD OF CONTROLLING OPERATION THEREOF

CROSS-REFERENCE TO RELATED APPLICATION

The present application claims the priority benefit of Korean Patent Application No. 10-2016-0086680, filed Jul. 8, 2016, the disclosure of which is incorporated herein by reference.

BACKGROUND OF THE INVENTION

Field of the Invention

The present invention relates to a cold/warm headrest for a vehicle and a method of controlling operation thereof, and more particularly to a cold/warm headrest for a vehicle and a method of controlling operation thereof, capable of improving ride quality and aiding in health management by providing cold air to an occupant's head and face and providing warmth to the occupant's neck and shoulders.

Description of Related Art

In general, a vehicle seat includes a seat cushion which supports the lower body of an occupant seated thereon, a seat back which supports the upper body thereof, and a headrest which supports the head thereof.

This headrest must serve to prevent an occupant's neck from being injured in the event of a rear-end accident. To this end, a variety of active headrests have been developed, and high-end headrests have been increasingly developed in order to provided cold air or warmth to occupants to increase the quality of vehicles and improve ride quality.

Conventional high-end headrests provide only cold air or warmth to seated occupants for each season or according to the air temperature in the vehicle interior, and hence have disadvantages of not selecting cold air or warmth according to the current body temperatures of the occupants. In addition, even in the case of a headrest which may selectively provide cold air or warmth, the cold air or warmth is provided only to one portion of a specified occupant. For this reason, occupants may also feel discomfort at the same time as comfort.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cold/warm headrest for a vehicle and a method of controlling operation thereof, capable of selectively or simultaneously providing cold air and warmth according to selection of an occupant, and of maximizing comfort while eliminating discomfort felt by the occupant by differently setting provision positions of cold air and warmth, thereby helping manage the health of the occupant.

In accordance with an aspect of the present invention, the above and other objects can be accomplished by the provision of a cold/warm headrest for a vehicle, which includes a duct installed in the headrest, and having an inlet for introduction of air and an outlet for discharge of air toward a front in which an occupant is located, and a thermo-element installed in the duct, and having a heat absorption part and a heat radiation part.

The cold/warm headrest may further include a heating element installed in the headrest such that the heating element is connected to or is not connected to the duct.

The cold/warm headrest may further include a blower installed at the inlet of the duct so as to suck air in a vehicle interior into the duct.

The cold/warm headrest may further include a controller installed in the headrest so as to individually control operation of the thermo-element and the heating element.

The duct may include an inlet-side duct and an outlet-side duct, the thermo-element may be installed in the outlet-side duct, and the heat radiation part of the thermo-element may be installed so as to be directed toward the outlet of the duct.

The heating element may be a surface heating element coupled to a headrest pad.

The headrest may include a main part supporting an occipital region of the occupant, and a lower support extending toward a neck and shoulders of the occupant from the main part, and the duct and the heating element may be respectively located in the main part and the lower support.

The outlet of the duct may be located at a center of the main part in order to provide cold air to the occipital region of the occupant.

The outlet of the duct may include outlets located to left and right sides of a center of main part in order to provide cold air to a side of a face of the occupant through convection heat transfer.

The outlet of the duct may be located at an upper side on a center of the main part in order to provide cold air above a head of the occupant and to a face thereof through convection heat transfer.

The heating element installed in the lower support may provide warmth to the neck and shoulders of the occupant.

The outlet of the duct may be installed toward a neck of the occupant, and a heating element may be installed in the headrest so as to be connected to the outlet of the duct.

In accordance with another aspect of the present invention, there is provided a method of controlling operation of a cold/warm headrest for a vehicle, which includes checking stages of operation when a heating switch is operated, and setting a target temperature depending on the stages of operation, applying a voltage to a heating element, and then determining whether a temperature of the heating element reaches the target temperature, after the checking stages of operation, and controlling the heating element such that the heating element is maintained at a constant temperature by controlling application of electric power to the heating element when the temperature of the heating element reaches the target temperature, after applying a voltage to a heating element.

The method may further include operating a timer when the voltage is applied to the heating element, after the checking stages of operation, comparing a time of operation of the timer with a reference time required until the temperature of the heating element reaches the target temperature for each stage of operation, when the temperature of the heating element is determined not to reach the target temperature in applying a voltage to a heating element, and turning off the electric power applied to the heating element so as to forcibly terminate a heating function, when the time of operation of the timer is determined to be larger than the reference time required until the temperature of the heating element reaches the target temperature for each stage of operation.

In accordance with a further aspect of the present invention, there is provided a method of controlling operation of a cold/warm headrest for a vehicle, which includes checking stages of operation when a cooling switch is operated, and setting a control strategy depending on the stages of operation, applying voltages to a thermo-element and a blower depending on the set control strategy, and then determining whether an interior temperature in a vehicle reaches a target temperature, and determining whether the stage of operation of the cooling switch is a low stage or a high stage when the interior temperature is determined to reach the target temperature, and controlling the interior temperature such that the interior temperature is maintained within a set temperature range by applying a hysteresis to the voltage applied to the thermo-element or the blower depending on the determined stage of operation.

The control strategy may include the target temperature, the maximum voltage applied to the thermo-element, and the voltage applied to the blower.

A hysteresis may be applied to the voltage applied to the thermo-element when the stage of operation of the cooling switch is determined to be the low stage in the determining whether the stage of operation of the cooling switch is a low stage or a high stage, and a hysteresis may be applied to the voltage applied to the blower when the stage of operation of the cooling switch is determined to be the high stage.

The hysteresis of the voltage applied to the thermo-element may be a high-temperature setting value (T2) or a low-temperature setting value (T3) obtained by adding or subtracting a certain temperature to or from a target temperature (T1). When the interior temperature is lower than the target temperature in a state in which the stage of operation of the cooling switch is the low stage, the voltage applied to the thermo-element may be reduced so as to conform to the high-temperature setting value (T2). When the interior temperature is higher than the target temperature in a state in which the stage of operation of the cooling switch is the low stage, the voltage applied to the thermo-element may be increased so as to conform to the low-temperature setting value (T3).

The hysteresis of the voltage applied to the blower may be a high-rotation setting value (R2) or a low-rotation setting value (R3) obtained by adding or subtracting a certain rpm to or from a reference rpm (R1) of the blower for each target temperature (T1). When the interior temperature is lower than the target temperature in a state in which the stage of operation of the cooling switch is the high stage, the voltage applied to the blower may be reduced so as to conform to the low-rotation setting value (R3). When the interior temperature is higher than the target temperature in a state in which the stage of operation of the cooling switch is the high stage, the voltage applied to the blower may be increased so as to conform to the high-rotation setting value (R2).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
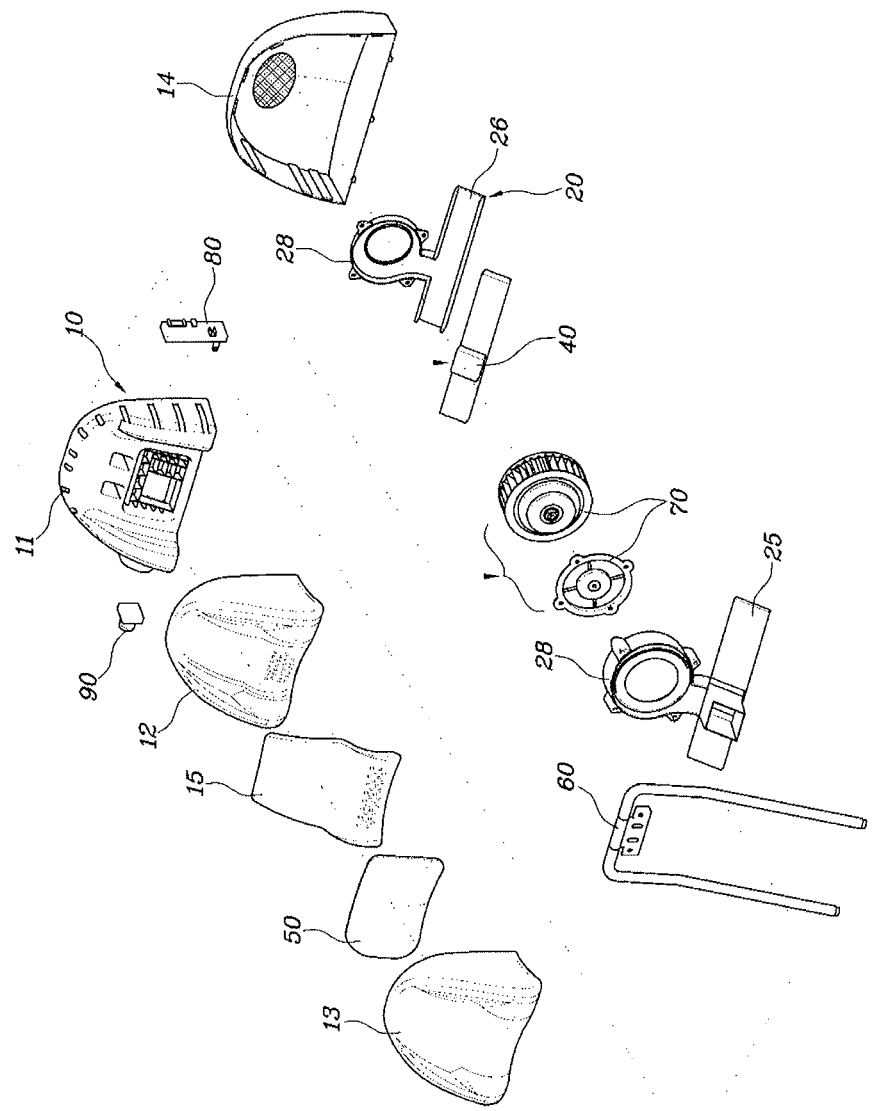
FIG. 1 is an exploded perspective view illustrating a cold/warm headrest according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
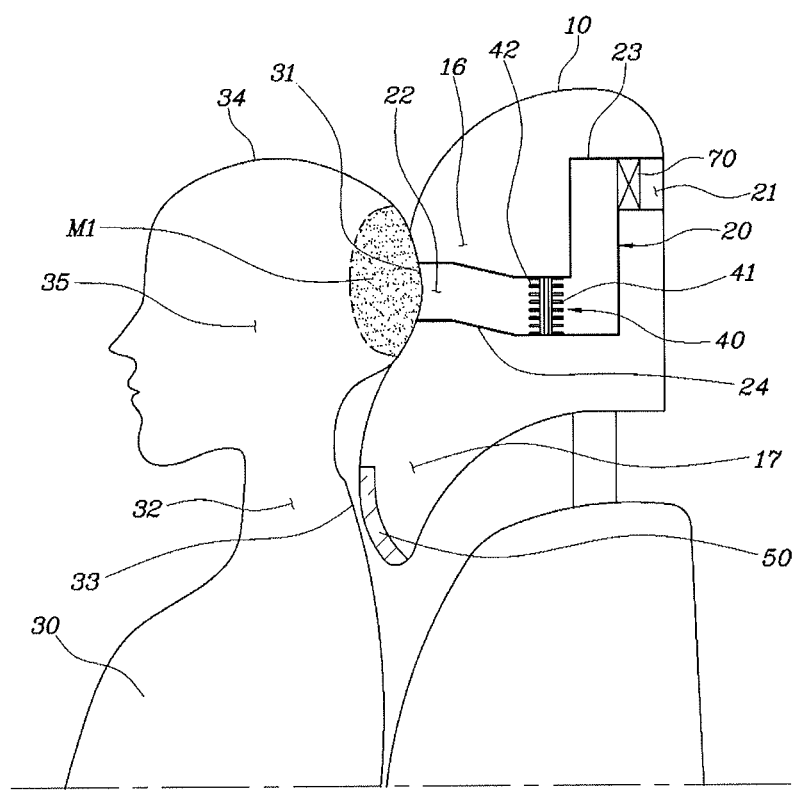
FIG. 2 and FIG. 3 are views illustrating a first example in which an outlet of a duct is located at the center of a main part of a headrest.

As illustrated in FIGS. 1 and 2, a cold/warm headrest for a vehicle according to an embodiment of the present invention includes a duct 20 which is installed in a headrest 10 and has an inlet 21 for the introduction of air and an outlet 22 for the discharge of air toward the front in which an occupant 30 is located, a thermo-element 40 which is installed in the duct 20 and has a heat absorption part 41 and a heat radiation part 42, and a heating element 50 which is installed in the headrest 10 such that the heating element 50 is connected to or is not connected to the duct 20.

The headrest 10 includes a frame 11 which defines the basic appearance thereof, a pad 12 which is supported by and coupled to the frame 11, a skin 13 which covers the pad 12, an outer cover which covers the rear of the frame 11, and a memory foam 15 which is coupled to the pad 12. The frame 11 is coupled with a headrest stay 60.

The duct 20 is configured in such a manner that an inlet-side duct 23 having an inlet 21 is connected to an outlet-side duct 24 having an outlet 22. The thermo-element 40 is installed in the outlet-side duct 24, and the heat radiation part 42 of the thermo-element 40 is installed so as to be directed toward the outlet 22 of the duct 20.

In addition, the duct 20 is an assembly including an upper duct cover 25 and a lower duct cover 26. A blower cover part 28 for covering a blower 70 to be described later is integrally or monolitcally formed in the upper duct cover 25 and the lower duct cover 26.

The inlet 21 of the duct 20 is opened rearward of the headrest 10, and the outlet 22 of the duct 20 is opened forward of the headrest 10. Filters for filtering foreign substances may also be installed in the inlet 21 and the outlet 22, as occasion demands.

When electric power is applied to the thermo-element 40, the thermo-element 40 may be a so-called Peltier element in which one side thereof is a heat absorption part 41 absorbing heat, and the other side thereof is a heat radiation part 42 radiating heat, according to the direction in which current flows therein.

The heating element 50 is preferably a surface heating element which is arranged in and coupled to the front surface of the pad 12 constituting the headrest 10, but the present invention is not limited thereto.

The surface heating element may be a surface heating element that uses sheet metal, a surface heating element that uses heating paint (carbon black), a surface heating element that uses carbon fiber, etc.

Moreover, the headrest according to the embodiment of the present invention further includes a blower 70 which is installed at the inlet 21 of the duct 20 so as to suck air in the vehicle interior into the duct 20, and a controller 80 which is installed in the headrest 10 so as to individually control the operation of the thermo-element 40 and the heating element 50.

The controller 80 controls the operation of the thermo-element 40 and the heating element 50 by turning on or off a switch 90. The controller 80 and the switch 90 are fixedly installed at the side of the frame 11 constituting the headrest 10.

The controller 80 may also include the function of the switch.

The headrest 10 includes a main part 16 which supports an occipital region 31 of the occupant 30, and a lower support 17 which extends toward a neck 32 and shoulders 33 of the occupant 30 from the main part 16. The duct 20 and the heating element 50 are respectively installed in the main part 16 and the lower support 17.

As described above, the structure in which the duct 20 is installed in the main part 16 and the heating element 50 is installed in the lower support 17 corresponds to a state in which the heating element 50 is installed in the headrest 10 so as not to be connected to the duct 20.

Typically, the method of keeping the head and face of a person cool and keeping the hands and feet thereof, which contain the ends of peripheral nerves, warm is widely known to be advantageous to health management.

As a result of experiments in which cold air and warmth are applied to each of the head, neck, and shoulders of the occupant seated on the seat, based on this fact, it can be seen that the occupant feels comfort only at the earliest point in time at which warmth is applied to the head, and discomfort rather than comfort is greater after a certain period of time. Accordingly, it is verified that the provision of cold air rather than warmth to the head of the occupant is better in terms of comfort.

It can be seen that the occupant feels comfort only at the earliest point in time, at which cold air is applied to the neck and shoulders thereof, which contain the aorta, and discomfort rather than comfort is greater due to the cold air after a certain period of time. Accordingly, it is verified that the provision of warmth rather than cold air to the neck and shoulders of the occupant so as to keep them warm is better.

Thus, the embodiment of the present invention aims to provide cold air to an occipital region 31, a head 34, and a face 35 of the occupant 30 using convection heat transfer, based on the result of the above-mentioned experiments. To this end, the duct 20, the blower 70, and the thermo-element 40 are installed in the main part 16 of the headrest 10 so as to have a ventilation structure.

In addition, the embodiment of the present invention aims to provide warmth to the neck 32 and shoulders 33 of the occupant 30, in which the trapezius muscles are located along with peripheral nerves, through heat transfer using the heating element 50, based on the result of the above-mentioned experiments. To this end, the heating element 50 is installed in the lower support 17 of the headrest 10.

Consequently, since the cold/warm headrest according to the embodiment of the present invention provides thermal comfort to the seated occupant in all seasons, it is possible to significantly improve ride quality and significantly aid in the health management of the occupant.

In the embodiment of the present invention, it is possible to provide cold air to different portions of the occupant 30 depending on the position of the outlet 22 of the duct 20.

Figure 3:
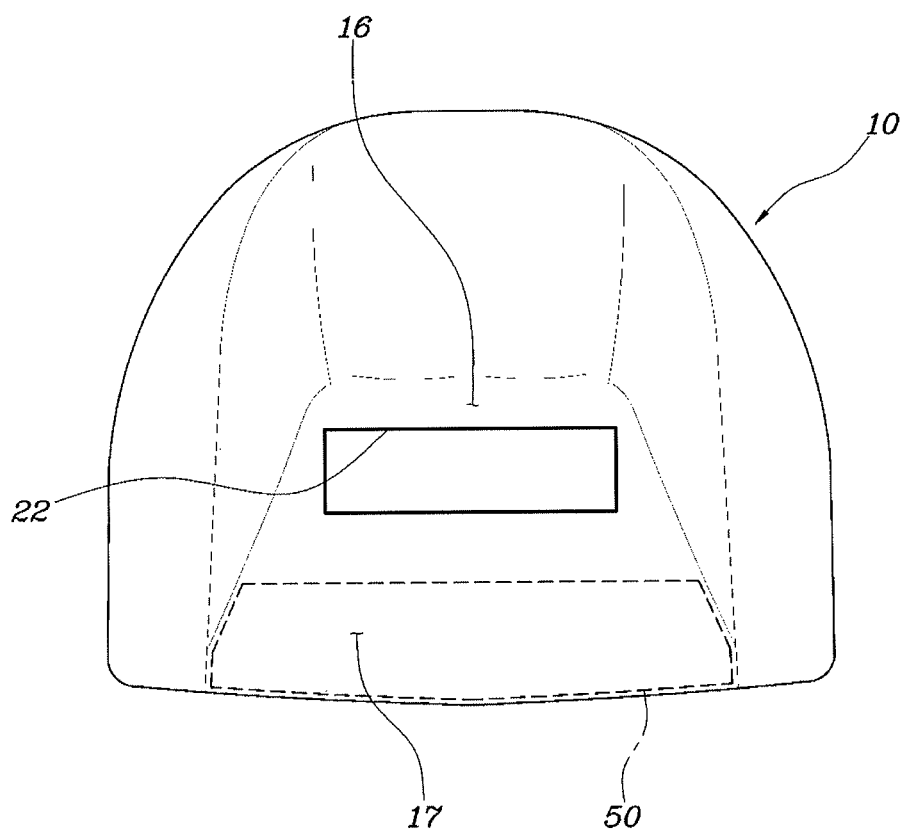

For example, as illustrated in FIGS. 2 and 3, when an outlet 22 of a duct 20 is located at the center of a main part 16 of a headrest 10, cold air discharged from the outlet 22 is provided to an occipital region 31 of an occupant 30. Reference numeral M1 illustrated in FIG. 2 refers to the occipital region 31 provided with cold air.

Figure 4:
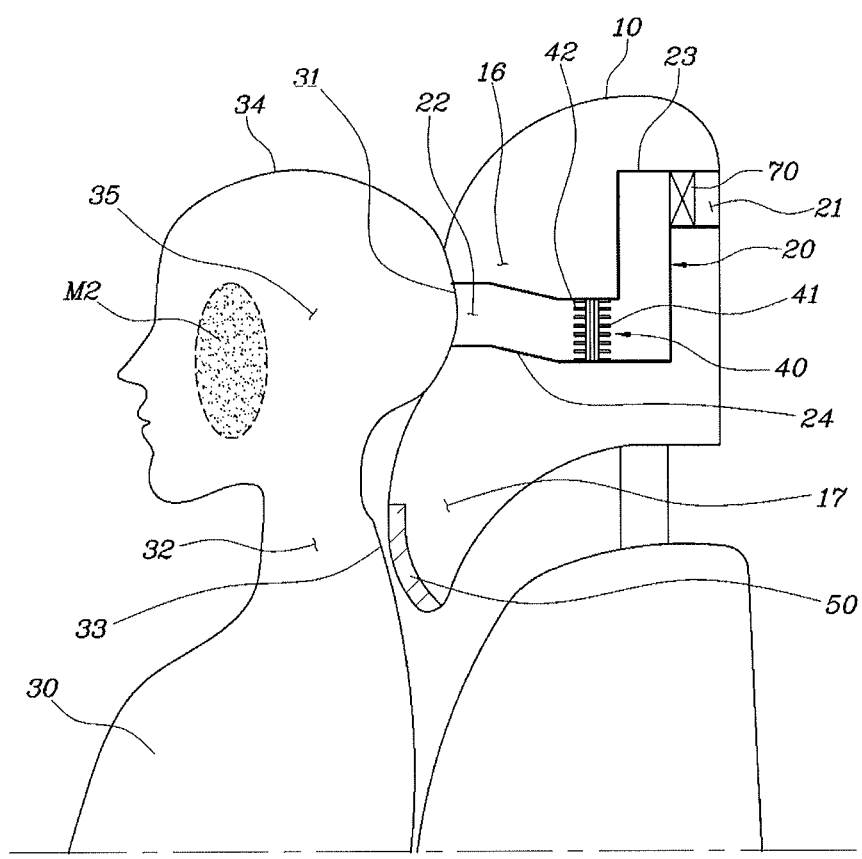
FIG. 4 and FIG. 5 are views illustrating a second example in which outlets of a duct are located on both sides on the center of a main part of a headrest.
Figure 5:
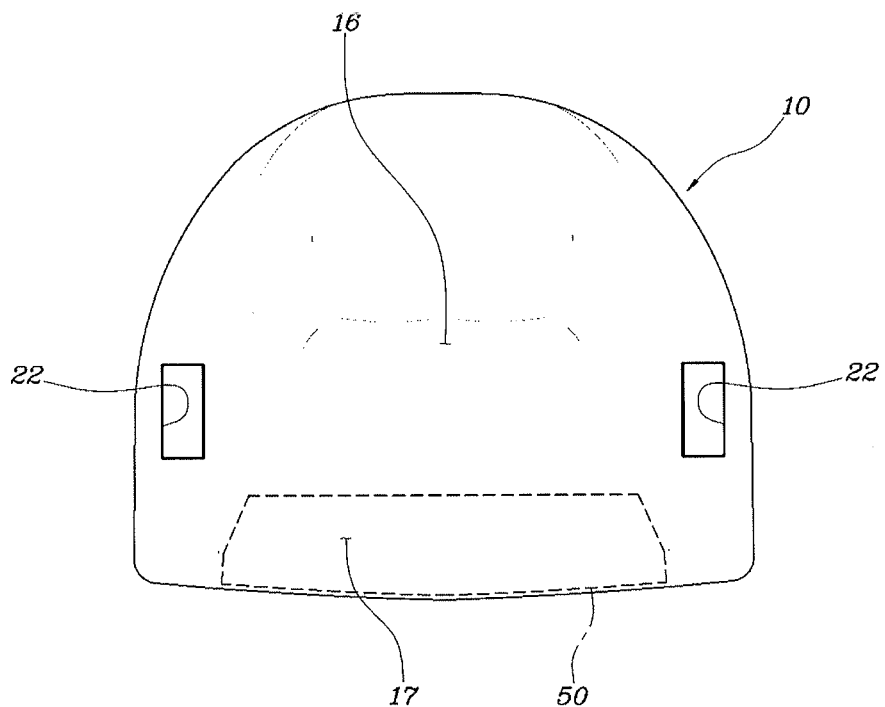

As illustrated in FIGS. 4 and 5, when outlets 22 of a duct 20 are located to the left and right of the center of a main part 16 of a headrest 10, cold air discharged from the outlets 22 is provided to a side of a face 35 of an occupant 30 through convection heat transfer. Reference numeral M2 illustrated in FIG. 4 refers to a region of the side of the face 35 provided with cold air.

Figure 6:
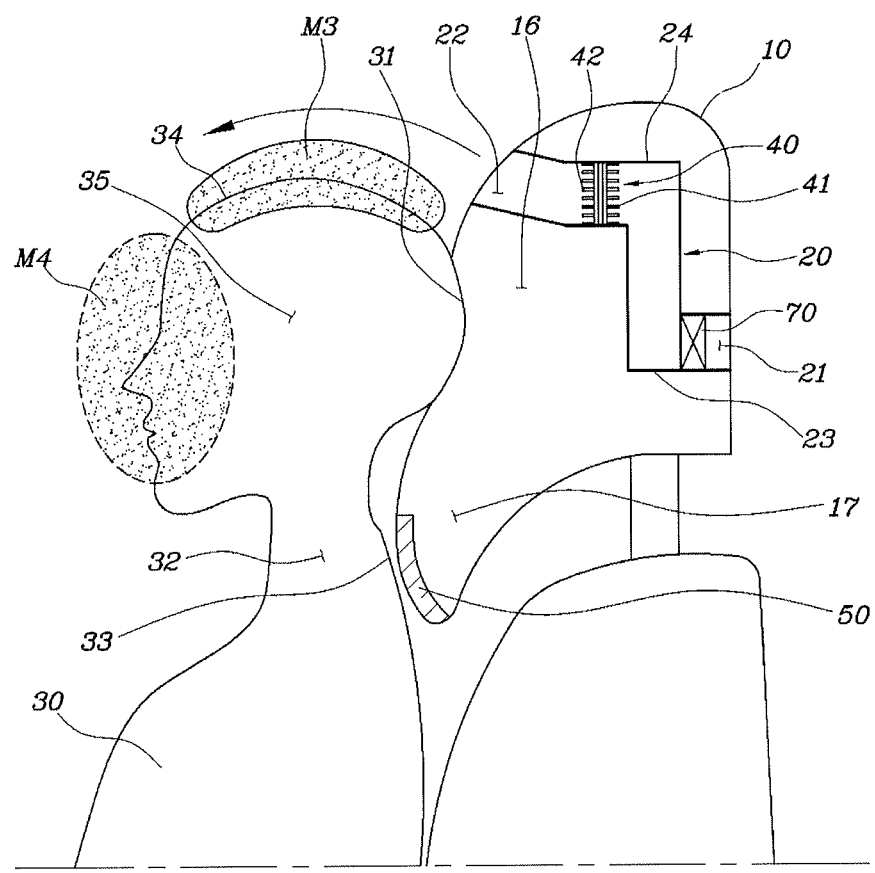
FIG. 6 and FIG. 7 are views illustrating a third example in which an outlet of a duct is located on the upper side of a main part of a headrest.
Figure 7:
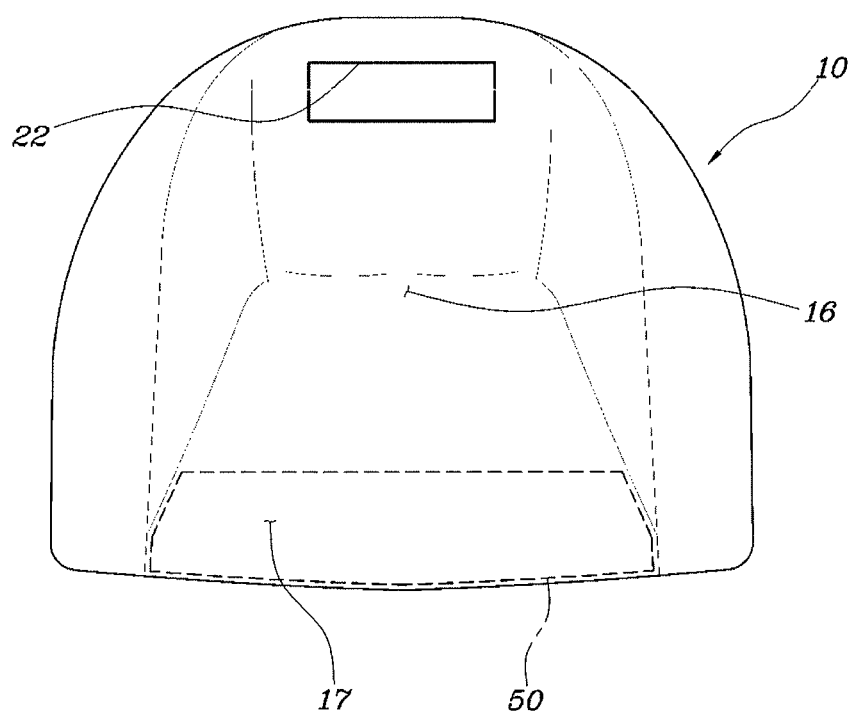

As illustrated in FIGS. 6 and 7, when an outlet 22 of a duct 20 is located at the upper side on the center of a main part 16 of a headrest 10, cold air discharged from the outlet 22 is provided above a head 34 of an occupant 30 and to a face 35 thereof through convection heat transfer. Reference numerals M3 and M4 illustrated in FIG. 6 refer to a region above the head 34 of the occupant 30 and a region of the face 35 provided with cold air.

The heating element 50 installed in the lower support 17 of the headrest 10 provides warmth to the neck 32 and shoulders 33 of the occupant 30 through contact therewith.

Figure 8:
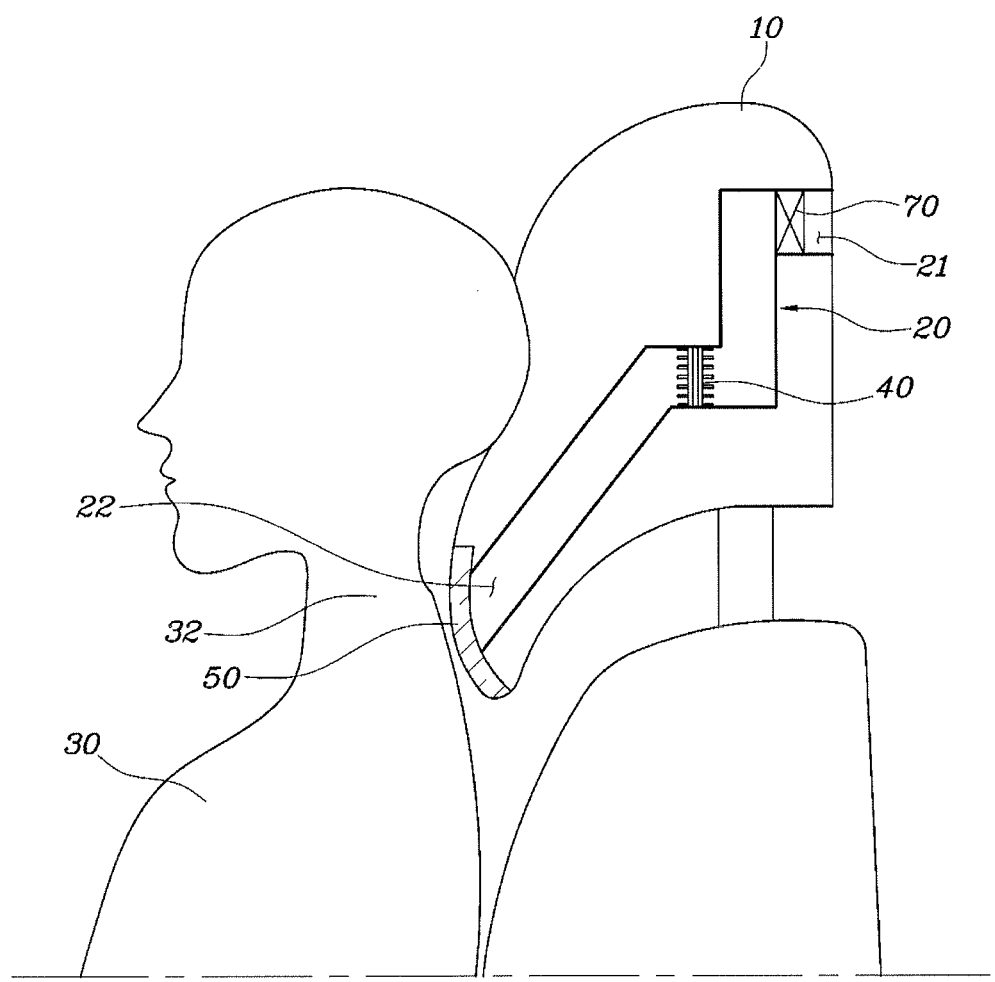
FIG. 8 is a view illustrating a fourth example in which an outlet of a duct is installed toward a neck of an occupant.

As illustrated in FIG. 8, when a heating element 50 is installed in a headrest 10 so as to be connected to a duct 20, an outlet 22 of the duct 20 is installed toward the neck 32 of an occupant 30. Accordingly, the heating element 50 is installed in the headrest 10 so as to be connected to the outlet 22 of the duct 20.

In this case, it is possible to more efficiently provide cold air and warm air to the neck 32 of the occupant.

Figure 9:
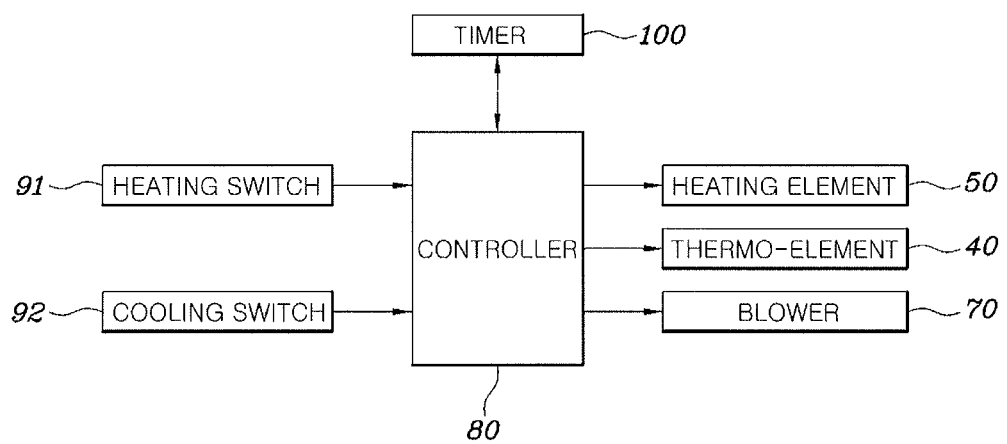
FIG. 9 is a block diagram illustrating a method of controlling operation of a cold/warm headrest according to another embodiment of the present invention.
Figure 10:
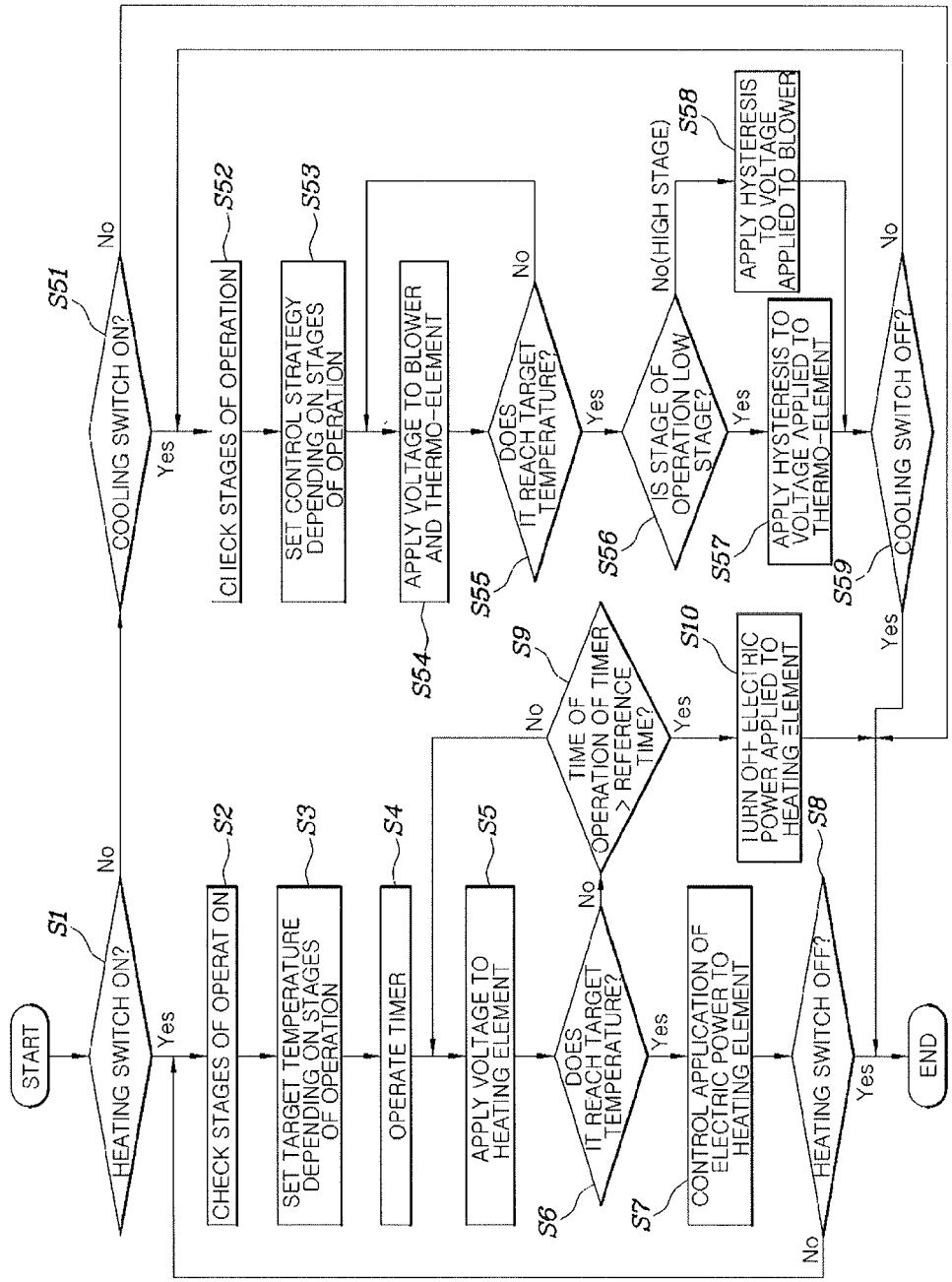
FIG. 10 is a flowchart illustrating a method of controlling operation of a cold/warm headrest according to another embodiment of the present invention.

FIG. 9 illustrates a block diagram illustrating a method of controlling operation of a cold/warm headrest according to another embodiment of the present invention. FIG. 10 illustrates a flowchart illustrating a method of controlling operation of a cold/warm headrest according to another embodiment of the present invention. A switch 90 largely includes a heating switch 91 and a cooling switch 92. A controller 80 individually controls the operation of a thermo-element 40, a heating element 50, and a blower 70 by turning on or off the heating switch 91 and the cooling switch 92, and controls the operation of a timer 100.

When a user operates the heating switch 91 (step S1), the controller 80 checks stages of operation of the heating switch 91 (step S2), and sets a target temperature depending on the stages of operation (step S3).

A voltage is applied to the heating element 50 after the target temperature is set for each stage of operation (step S5), and it is determined that the temperature of the heating element 50 reaches the target temperature after a certain period of time (step S6). In this case, when the temperature of the heating element 50 is determined to reach the target temperature, the controller 80 controls the application of electric power to the heating element 50 (step S7), with the consequence that the heating element 50 is maintained at the set target temperature.

When the user turns off the heating switch 91 (step S8), the control logic according to the embodiment is completed.

Meanwhile, when the voltage is applied to the heating element 50 after step S3, the timer 100 is operated together under the control of the controller 80 (step S4). When the temperature of the heating element 50 is determined not to reach the target temperature in step S6, the controller 80 compares a time of operation of the timer 100 with a reference time required until the temperature of the heating element 50 reaches the target temperature for each stage of operation (step S9).

When the time of operation of the timer 100 is determined to be larger than the reference time required until the temperature of the heating element 50 reaches the target temperature for each stage of operation as a result of the comparison in step S9, the controller 80 turns off the electric power applied to the heating element 50 to forcibly terminate a heating function (step S10. Through such a structure, it is possible to provide a fail-safe function.

The case where the time of operation of the timer 100 is larger than the reference time required until the temperature of the heating element 50 reaches the target temperature for each stage of operation as a result of the comparison in step S9 is a case where an NTC (Negative Temperature Coefficient) sensor malfunctions or a system fails. In this case, if electric power continues to be applied to the heating element 50, the entire system may be damaged or broken. Therefore, the present invention has a structure that provides a fail-safe function.

When the time of operation of the timer 100 is determined to be smaller than the reference time required until the temperature of the heating element 50 reaches the target temperature for each stage of operation as a result of the comparison in step S9, the process is fed back to the step before step S5, and the heating control logic according to the embodiment of the present invention is continuously performed.

When a user operates the cooling switch 92 (step S51), the controller 80 checks stages of operation of the cooling switch 92 (step S52), and sets a control strategy depending on the stages of operation (step S53).

Here, the control strategy for each stage of operation includes a target temperature, a maximum voltage applied to the thermo-element 40, and a voltage applied to the blower 70.

Voltages are applied to the thermo-element 40 and the blower 70 depending on the set control strategy (step S54), and it is determined that the interior temperature in a vehicle reaches a target temperature after a certain period of time (step S55). In this case, when the interior temperature is determined to reach the target temperature, the controller 80 determines whether the stage of operation of the cooling switch 92 is a low stage or a high stage (step S56).

It is preferable that, when the stage of operation of the cooling switch 92 is equal to or less than a second stage, it is determined to be a low stage, and when the stage of operation of the cooling switch 92 is equal to or greater than a third stage, it is determined to be a high stage. However, the present invention is not limited thereto.

When the interior temperature in the vehicle is determined not to reach the target temperature in step S55, the process is fed back to the step before step S54, and the cooling control logic according to the embodiment of the present invention is continuously performed.

A hysteresis is applied to the voltage applied to the thermo-element 40 or the blower 70 depending on the stage of operation of the cooling switch 92 which is determined in step S56, so that the interior temperature is controlled to be maintained within a set temperature range. That is, when the stage of operation of the cooling switch 92 is a low stage, the hysteresis is applied to the voltage applied to the thermo-element 40 (step S57), and when the stage of operation of the cooling switch 92 is a high stage, the hysteresis is applied to the voltage applied to the blower 70 (step S58).

Here, the hysteresis of the voltage applied to the thermo-element 40 is a high-temperature setting value (T2) or a low-temperature setting value (T3) obtained by adding or subtracting a certain temperature to or from a target temperature (T1). When the interior temperature is lower than the target temperature in the state in which the stage of operation of the cooling switch 92 is a low stage, the voltage applied to the thermo-element 40 is reduced so as to conform to the high-temperature setting value (T2). In addition, when the interior temperature is higher than the target temperature in the state in which the stage of operation of the cooling switch 92 is a low stage, the voltage applied to the thermo-element 40 is increased so as to conform to the low-temperature setting value (T3). As a result, since the set temperature automatically varies depending on the interior temperature in the vehicle, the interior air in the vehicle can be more comfortably maintained.

The hysteresis of the voltage applied to the blower 70 is a high-rotation setting value (R2) or a low-rotation setting value (R3) obtained by adding or subtracting a certain rpm to or from a reference rpm (R1) of the blower 70 for each target temperature (T1). When the interior temperature is lower than the target temperature in the state in which the stage of operation of the cooling switch 92 is a high stage, the voltage applied to the blower 70 is reduced so as to conform to the low-rotation setting value (R3). In addition, when the interior temperature is higher than the target temperature in the state in which the stage of operation of the cooling switch 92 is a high stage, the voltage applied to the blower 70 is increased so as to conform to the high-rotation setting value (R2). As a result, since the set temperature automatically varies depending on the interior temperature in the vehicle, the interior air in the vehicle can be more comfortably maintained.

When the user turns off the cooling switch 92, the cooling control logic according to the embodiment of the present invention is completed.

In the embodiment of the present invention as described above, it is possible to provide cold air to the occipital region 31, head 34, and face 35 of the occupant 30 through convection heat transfer using the duct 20, the blower 70, and the thermo-element 40, and to provide warmth to the neck 32 and shoulders 33 of the occupant 30, in which the trapezius muscles are located along with peripheral nerves, through heat transfer using the heating element 50. As a result, through such a structure, the seated occupant 30 can feel thermal comfort in all seasons. Therefore, it is possible to significantly improve ride quality and significantly aid in the health management of the occupant.

As is apparent from the above description, it is possible to provide cold air to the occipital region, head, and face of a seated occupant through convection heat transfer using a duct, a blower, and a thermo-element, and to provide warmth to the neck and shoulders of the occupant, in which the trapezius muscles are located along with peripheral nerves, through heat transfer using a heating element. As a result, through such a structure, the seated occupant can feel thermal comfort in all seasons. Therefore, it is possible to significantly improve ride quality and significantly aid in the health management of the occupant.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A headrest for a vehicle, comprising:
   a duct installed in the headrest, and having an inlet for introduction of air and an outlet for discharge of air toward a front of the headrest;
   a thermo-element installed in the duct, and having a heat absorption part and a heat radiation part; and
   a heating element mounted in the headrest,
   wherein the heating element is a surface heating element coupled to a headrest pad, and
   wherein the surface heating element is at least one of a surface heating element that uses sheet metal, a surface heating element that uses heating paint, and a surface heating element that uses carbon fiber.

2. The headrest according to claim 1, further comprising the heating element installed in the headrest such that the heating element is selectively connected to the duct.

3. The headrest according to claim 2, further comprising a controller installed in the headrest to individually control operation of the thermo-element and the heating element.

4. The headrest according to claim 2, wherein
   the headrest comprises a main part supporting an occipital region of the occupant, and a lower support configured for extending toward a neck and shoulders of the occupant from the main part; and
   the duct and the heating element are respectively located in the main part and the lower support.

5. The headrest according to claim 4, wherein the outlet of the duct is located at a center of the main part to provide cold air to the occipital region of the occupant.

6. The headrest according to claim 4, wherein the outlet of the duct includes outlets located to predetermined sides of a center of the main part configured to provide cold air to a side of a face of the occupant through convection heat transfer.

7. The headrest according to claim 4, wherein the outlet of the duct is located at an upper side on a center of the main part configured to provide cold air above a head of the occupant and to a face thereof through convection heat transfer.

8. The headrest according to claim 4, wherein the heating element installed in the lower support is configured to provide warmth to the neck and shoulders of the occupant.

9. The headrest according to claim 1, further comprising a blower installed at the inlet of the duct to draw air in a vehicle interior into the duct.

10. The headrest according to claim 1, wherein:
    the duct comprises an inlet-side duct and an outlet-side duct; and
    the thermo-element is installed in the outlet-side duct, and the heat radiation part of the thermo-element is installed to be directed toward the outlet of the duct.

11. The headrest according to claim 1, wherein
    the outlet of the duct is installed and configured to face toward a neck of the occupant; and
    the heating element is installed in the headrest to be connected to the outlet of the duct.

12. A method of controlling operation of a headrest for a vehicle, comprising:
    checking stages of operation when a heating switch is operated, and setting a target temperature depending on the stages of the operation;
    applying a voltage to a heating element, and then determining whether a temperature of the heating element reaches the target temperature, after the checking the stages of the operation, wherein a timer is operated when the voltage is applied to the heating element, after the checking of the stages of the operation;
    controlling the heating element such that the heating element is maintained at a constant temperature by controlling application of electric power to the heating element when the temperature of the heating element reaches the target temperature, after applying the voltage to the heating element;
    comparing a time of operation of the timer with a reference time required until the temperature of the heating element reaches the target temperature for each stage of operation, when the temperature of the heating element is determined not to reach the target temperature in applying the voltage to the heating element; and
    turning off the electric power applied to the heating element to forcibly terminate a heating function thereof, when the time of operation of the timer is determined to be larger than the reference time required until the temperature of the heating element reaches the target temperature for each stage of operation.

13. A method of controlling operation of a headrest for a vehicle, comprising:
    checking stages of operation when a cooling switch is operated, and setting a control strategy depending on the stages of the operation;
    applying voltages to a thermo-element and a blower depending on the set control strategy, and then determining whether an interior temperature in the vehicle reaches a target temperature; and
    determining whether the stage of the operation of the cooling switch is a low stage or a high stage when the interior temperature is determined to reach the target temperature, and controlling the interior temperature such that the interior temperature is maintained within a set temperature range by applying a first hysteresis to the voltage applied to the thermo-element or a second hysteresis to the blower depending on the determined stage of operation, wherein the first hysteresis is applied to the voltage applied to the thermo-element to reduce the voltage applied to the thermos-element when the stage of operation of the cooling switch is determined to be the low stage in the determining whether the stage of operation of the cooling switch is a low stage or a high stage, and the second hysteresis is applied to the voltage applied to the blower to increase the voltage applied to the blower when the stage of operation of the cooling switch is determined to be the high stage.

14. The method according to claim 13, wherein the control strategy comprises the target temperature, a maximum voltage applied to the thermo-element, and the voltage applied to the blower.

15. The method according to claim 13, wherein the first hysteresis of the voltage applied to the thermo-element is a high-temperature setting value or a low-temperature setting value obtained by adding or subtracting a predetermined temperature to or from the target temperature:

when the interior temperature is lower than the target temperature in a state in which the stage of operation of the cooling switch is the low stage, the voltage applied to the thermo-element is reduced to conform to the high-temperature setting value; and when the interior temperature is higher than the target temperature in a state in which the stage of operation of the cooling switch is the low stage, the voltage applied to the thermo-element is increased to conform to the low-temperature setting value.

16. The method according to claim 13, wherein

The second hysteresis of the voltage applied to the blower is a high-rotation setting value or a low-rotation setting value obtained by adding or subtracting a predetermined rpm to or from a reference rpm of the blower for each target temperature;

when the interior temperature is lower than the target temperature in a state in which the stage of operation of the cooling switch is the high stage, the voltage applied to the blower is reduced to conform to the low-rotation setting value; and when the interior temperature is higher than the target temperature in a state in which the stage of operation of the cooling switch is the high stage, the voltage applied to the blower is increased to conform to the high-rotation setting value.

* * * * *